(12) United States Patent
Ahmed et al.

(10) Patent No.: US 8,843,094 B2
(45) Date of Patent: Sep. 23, 2014

(54) METHOD AND SYSTEM FOR BLOCKER DETECTON AND AUTOMATIC GAIN CONTROL

(75) Inventors: Walid Ahmed, Tinton Falls, NJ (US);
John Leung, Irvine, CA (US);
Theodoros Georgantas, Chaidari (GR);
Morten Damgaard, Laguna Hills, CA (US); Nelson Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 950 days.

(21) Appl. No.: 12/853,131

(22) Filed: Aug. 9, 2010

(65) Prior Publication Data

US 2012/0004005 A1    Jan. 5, 2012

Related U.S. Application Data

(60) Provisional application No. 61/360,793, filed on Jul. 1, 2010.

(51) Int. Cl.
| | |
|---|---|
| H04B 1/06 | (2006.01) |
| H04B 7/00 | (2006.01) |
| H04W 52/24 | (2009.01) |
| H04W 52/52 | (2009.01) |
| H04B 17/00 | (2006.01) |

(52) U.S. Cl.
CPC ............ *H04W 52/52* (2013.01); *H04W 52/246* (2013.01); *H04W 52/245* (2013.01); *H04B 17/0057* (2013.01)
USPC ...................... 455/245.2; 455/247.1; 455/254; 455/307; 455/226.2

(58) Field of Classification Search
USPC ........ 455/226.2, 226.4, 134, 138, 232.1–254, 455/296–312
See application file for complete search history.

(56) References Cited

U.S. PATENT DOCUMENTS

| | | | | |
|---|---|---|---|---|
| 5,621,414 | A * | 4/1997 | Nakagawa | 342/350 |
| 7,010,330 | B1 * | 3/2006 | Tsividis | 455/574 |
| 7,426,376 | B2 * | 9/2008 | Srinivasan et al. | 455/252.1 |
| 7,429,891 | B2 * | 9/2008 | Darabi et al. | 330/132 |
| 7,639,998 | B1 * | 12/2009 | Halvorson | 455/251.1 |
| 7,653,368 | B2 * | 1/2010 | Ashkenazi | 455/234.1 |
| 7,706,766 | B2 * | 4/2010 | Vavelidis et al. | 455/234.1 |
| 8,045,941 | B2 * | 10/2011 | Muhammad et al. | 455/232.1 |
| 8,126,094 | B2 * | 2/2012 | Komaili et al. | 375/345 |
| 8,301,097 | B2 * | 10/2012 | Darabi et al. | 455/234.1 |

(Continued)

*Primary Examiner* — Edward Urban
*Assistant Examiner* — Rui Hu
(74) *Attorney, Agent, or Firm* — Sterne, Kessler, Goldstein & Fox P.L.L.C.

(57) ABSTRACT

Aspects of a method and system for integrated blocker detection and automatic gain control are provided. In this regard, a communication device may generate one or more first signal strength indications based on a strength of a received signal at a first point in the analog front-end of the communication device. The communication device may generate one or more second signal strength indications based on a strength of the received signal at a second point in a digital processing module of the communication device. The first point in the analog front-end may be an input or an output of a down-conversion mixer. The second point in the digital processing module may be an output of an analog-to-digital converter or an output of a channel selection filter. The communication device may control, utilizing the first signal strength indication(s) and the second signal strength indication(s), a gain of one or more components of the communication device.

20 Claims, 7 Drawing Sheets

(56) References Cited

U.S. PATENT DOCUMENTS

| | | | |
|---|---|---|---|
| 2002/0183027 A1* | 12/2002 | Husted et al. | 455/219 |
| 2003/0064692 A1* | 4/2003 | Shi | 455/232.1 |
| 2003/0078007 A1* | 4/2003 | Parssinen et al. | 455/67.1 |
| 2007/0129034 A1* | 6/2007 | Adams et al. | 455/138 |
| 2008/0170646 A1* | 7/2008 | Sobchak et al. | 375/345 |
| 2008/0181337 A1* | 7/2008 | Maxim | 375/340 |
| 2008/0194221 A1* | 8/2008 | Uramoto et al. | 455/226.1 |
| 2009/0042527 A1* | 2/2009 | Niknejad | 455/234.2 |
| 2009/0061809 A1* | 3/2009 | Muhammad et al. | 455/313 |
| 2009/0074042 A1* | 3/2009 | Lin | 375/224 |
| 2009/0079611 A1* | 3/2009 | Hwang et al. | 341/155 |
| 2009/0163165 A1* | 6/2009 | Oomoto | 455/253.2 |
| 2009/0280764 A1* | 11/2009 | Rofougaran et al. | 455/226.2 |
| 2010/0048154 A1* | 2/2010 | Rofougaran | 455/233.1 |
| 2010/0048196 A1* | 2/2010 | Georgantas et al. | 455/422.1 |
| 2010/0296567 A1* | 11/2010 | Qiu et al. | 375/227 |
| 2011/0007780 A1* | 1/2011 | Shimoni | 375/136 |
| 2011/0230156 A1* | 9/2011 | Mehrmanesh et al. | 455/234.1 |
| 2011/0235758 A1* | 9/2011 | Khoini-Poorfard et al. | 375/345 |

\* cited by examiner

METHOD AND SYSTEM FOR BLOCKER DETECTON AND AUTOMATIC GAIN CONTROL

CROSS-REFERENCE TO RELATED APPLICATIONS/INCORPORATION BY REFERENCE

This patent application makes reference to, claims priority to and claims benefit from U.S. Provisional Patent Application Ser. No. 61/360,793 filed on Jul. 1, 2010.

Each of the above identified applications is hereby incorporated herein by reference in its entirety.

FIELD OF THE INVENTION

Certain embodiments of the invention relate to communications. More specifically, certain embodiments of the invention relate to a method and system for blocker detection and automatic gain control.

BACKGROUND OF THE INVENTION

As devices and fabrication technologies get smaller and more complex, dealing with noise in communication devices becomes increasingly difficult. Additionally, as the number of wireless communication devices and wireless communication protocols in use continues to increase, dealing with interference in the communication devices also becomes increasingly difficult. Compounding the difficulties facing system designers is that conventional techniques for mitigating the effects of interference are often in contention with techniques for improving the noise figure of the communication device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for blocker detection and automatic gain control, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for blocker detection and automatic gain control. In various embodiments of the invention, a communication device may generate a first signal strength indication based on a strength of a received signal at a point in the analog front-end of the communication device. The communication device may generate a second signal strength indication based on a strength of the received signal at a point in a digital processing module of the communication device. The points in the analog front-end may be, respectively, an input and an output of a down-conversion mixer. The points in the digital processing module may be, respectively, an output of an analog-to-digital converter and an output of a channel selection filter. The communication device may control, utilizing the first signal strength indication and the second signal strength indication, a gain of one or more components of the communication device. Generation of the first signal strength indication may comprise converting the output of the down-conversion mixer to a digital signal, squaring the digital signal to generate a squared signal; integrating the squared signal to generate a power signal, and detecting peaks of the power signal. The communication device may determine, utilizing the first signal strength indication and the second signal strength indication, whether a blocker signal is present in the received signal. The communication device may control the gain of the components based on a result of the determination of whether a blocker is present. The communication device may determine, utilizing the first signal strength indication and the second signal strength indication, a strength of a blocker signal present in the received signal. The communication device may control the gain based on a result of the determination of the strength of the blocker signal.

Values of the first signal strength indication may be generated periodically or aperiodically, and the gain of the components may be controlled based on a comparison of a current value of the first signal strength indication with a previous value of the first signal strength indication. The current value of the first signal strength indication may be scaled utilizing a first scaling factor in instances that the current value of the first signal strength indication is greater than the sum or the previous value of the first signal strength indication and a first margin. The current value of the first signal strength indication may be scaled by a second scaling factor in instances that the current value of the first signal strength indication is less than the previous value of the first signal strength indication minus a second margin. The gain of the one or more components may be controlled utilizing a first look-up table in instances that the current value of the first signal strength indication is greater than a sum of current value of the second signal strength indication and a margin. The gain of the one or more components may be controlled utilizing a second look-up table in instances that the current value of the first signal strength indication is less than the sum of a current value of the second signal strength indication and a margin.

Figure 1:
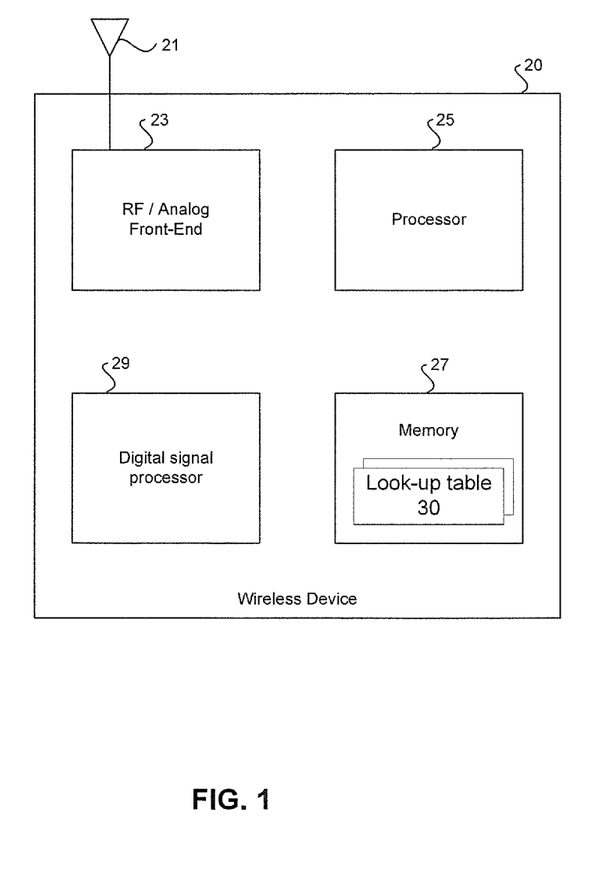
FIG. 1 is a block diagram illustrating an exemplary communication device, in accordance with an embodiment of the invention.

FIG. 1 is a block diagram illustrating an exemplary communication device, in accordance with an embodiment of the invention. Referring to FIG. 1, there is shown a communication device 20 comprising an analog front-end 23, a digital signal processor (DSP) 29, a processor 25, and a memory 27. An antenna 21 may be communicatively coupled to the analog front-end 23. The communication device 20 may transmit and receive information in accordance with any suitable wireless communication standards. In an exemplary embodiment of the invention, the communication device 20 may support 2G, 3G, and/or 4G wireless standards. In various embodiments of the invention, any combination of one or more of the analog front-end 23, the digital baseband processor 29, the processor 25, and the memory 27 may be integrated on one or more semiconductor substrates. For example, the communication device 20 may comprise a single "system on chip."

The analog front-end 23 may comprise suitable logic, circuitry, interfaces, and/or code that may enable processing of received signals and processing of signals to be transmitted. The analog front-end 23 may be operable to receive, transmit, filter, amplify, down-convert, up-convert, perform analog-to-digital conversion and/or digital-to-analog conversion. In various embodiment of the invention, linearity of the analog front-end 23 may be dynamically controlled. In this regard, the gain of one or more components of the analog front-end 23 may be controlled based on the presence and/or strength of undesired, or "blocker," signals. In this manner, the gain may be controlled to prevent a blocker signal from causing one or more components of the analog front-end 23 to operate in a saturation, or gain compression, region.

The DSP 29 may comprise suitable logic, circuitry, interfaces, and/or code that may enable processing and/or handling of baseband signals. In this regard, the DSP 29 may process or handle signals received via analog front-end 23 and/or to be transmitted via the analog front-end 23. The DSP 29 may also provide control signals and/or feedback information to analog front-end 23 based on information from the processed signals.

The processor 25 may comprise suitable logic, circuitry, interfaces, and/or code that may be operable to perform various aspects of the invention. The processor 25 may be operable to process received and/or to be transmitted data. The processor 25 may be operable to execute instructions to control operations of the communication device 20. For example, the processor may run an operating system for the communication device 20. The processor 25 may be operable to control at least a portion of the analog front-end 23, the digital baseband processor 29, and/or the memory 27.

The memory 27 may comprise suitable logic, circuitry, interfaces, and/or code that may enable storage of code, data and/or other information utilized by the communication device 20. The memory 27 may store one or more lines of code that may be executed by the processor 25. For example, the memory 27 may store code of an operating system that may be executed by the processor 25. The memory 27 may store received data and/or data to be transmitted. The memory 27 may store information, such as configuration information, that may be utilized to control the operation of at least one block in the communication device 20. For example, the memory 27 may comprise one or more look-up tables 30 which may be utilized to control a gain of one or more components of the analog front-end 23.

In operation, a signal may be received via the antenna 21, processed by the analog front-end 23, converted to digital, conveyed to the DSP 29 for further processing, and received data may then be, for example, output to a user and/or utilized by the processor 25 to, for example, cause the communication device 20 to perform some operation. The strength of the received signal may be measured at one or more points in the analog front-end 23 and at one or more points in the DSP 29. One or more of the signal strength measurements may be utilized to determine whether an undesired signal, a "blocker" signal, is present in the received signal. The signal strength measurements may be utilized to whether a "blocker" signal is present in the received signals and/or to determine a strength of a "blocker" signal present in the received signal. In various embodiments of the invention, the one or more signal strength measurements may be mathematically and/or logically combined, and a result of the combination may be utilized to detect the presence of, and/or determine a strength of, a blocker signal. In various embodiments of the invention, the one or more signal strength measurements may be sorted and/or filtered, and a result of the sorting and/or filtering may be utilized to detect the presence of, and/or determine a strength of, a blocker signal. For example, one or more maxima and/or minima of the one or more signal strength measurements may be determined and the maxima and/or minima may be detect the presence of, and/or determine a strength of, a blocker signal.

Figure 2A:
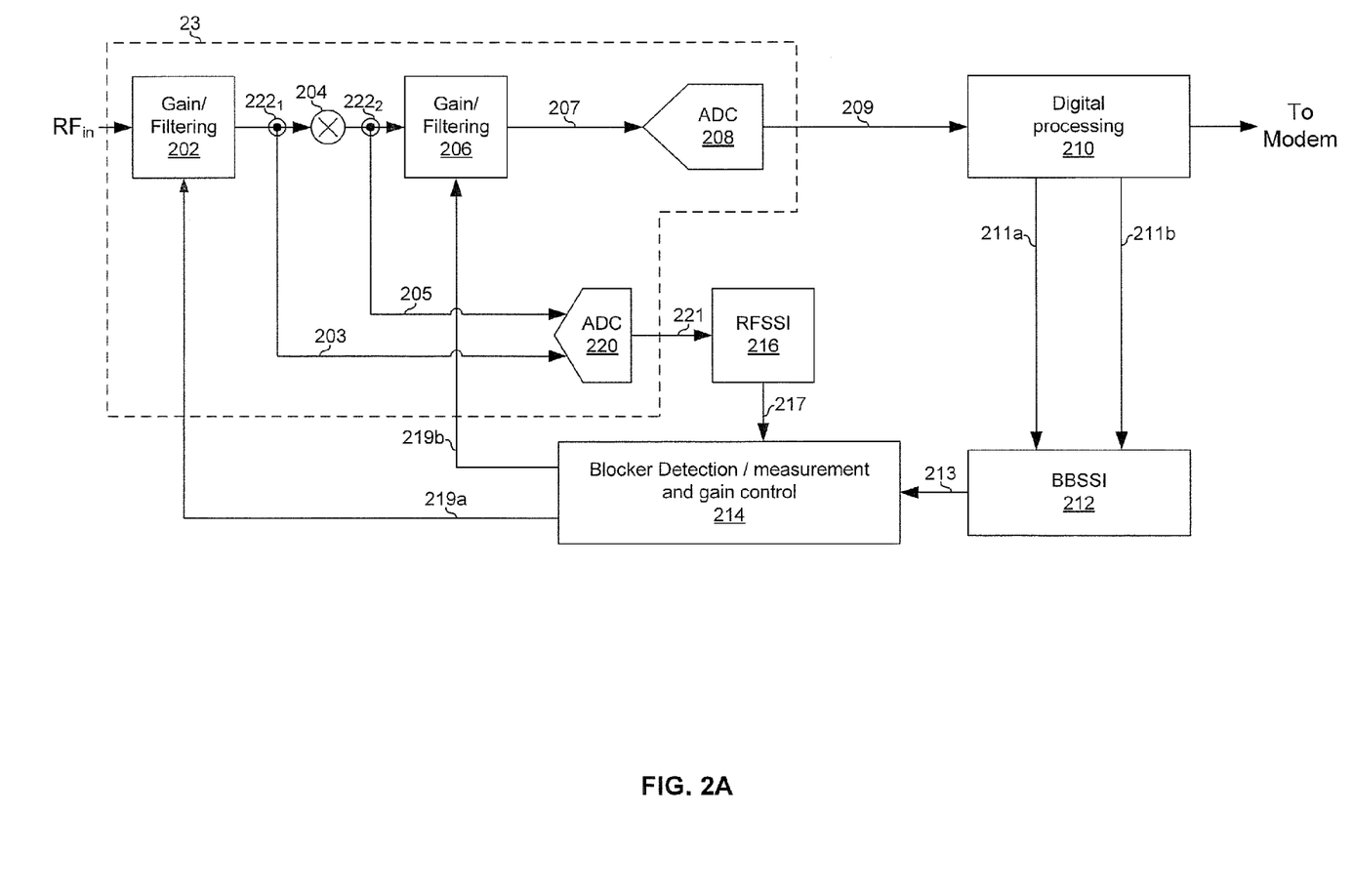
FIG. 2A is a block diagram illustrating an exemplary communication device that is operable to control linearity based on the presence and/or strength of a blocker signal, in accordance with an embodiment of the invention.

FIG. 2A is a block diagram illustrating an exemplary communication device that is operable to control linearity based on the presence and/or strength of a blocker signal, in accordance with an embodiment of the invention. Referring to FIG. 2A, there is shown a gain and/or filtering module 202, a mixer 204, gain and/or filtering module 206, an analog-to-digital converter (ADC) 208, a digital processing module 210, a baseband signal strength indication (BBSSI) module 212, a blocker detection and automatic gain control (AGC) module 214, a radio frequency signal strength indication (RFSSI) module 216, and an ADC 220.

The gain and/or filtering module 202 may comprise suitable logic, circuitry, interfaces, and/or code that may be operable to amplify and/or attenuate received signals and/or portions of received signals. In an exemplary embodiment of the invention, the gain and/or filtering module 202 may comprise a low noise amplifier (LNA). In an exemplary embodiment of the invention, the gain and/or filtering module 202 may be implemented in the analog front-end 23 of FIG. 1.

The mixer 204 may comprise suitable logic, circuitry, interfaces and/or code that may be operable to down-convert received RF signals utilizing a local oscillator signals. In an exemplary embodiment of the invention, the mixer 204 may down-convert received signals to baseband for $3^{rd}$ generation (3G) wireless technologies and may down-convert received signals to an intermediate frequency (IF) for $2^{nd}$ generation (2G) wireless technologies. In an exemplary embodiment of the invention, the mixer 204 may be implemented in the analog front-end 23 of FIG. 1.

The gain and/or filtering module 206 may comprise suitable logic, circuitry, interfaces, and/or code that may be operable to amplify and/or attenuate received signals and/or portions of received signals. In an exemplary embodiment of the invention, the gain and/or filtering module 206 may comprise one or more low-pass filters and/or equalizers. In an exemplary embodiment of the invention, the gain and/or filtering module 206 may be implemented in the analog front-end 23 of FIG. 1.

The analog-to-digital converter (ADC) 208 may comprise suitable logic, circuitry, interfaces, and/or code that may be operable to convert the analog signal 207 to a digital signal 209. In an exemplary embodiment of the invention, the ADC 208 may comprise a Delta-Sigma (ΔΣ) ADC and may be operable to digitize baseband signals when processing 3G signals and may be operable to digitize IF signals when processing 2G signals. In an exemplary embodiment of the invention, the ADC 208 may be implemented in the analog front-end 23 of FIG. 1.

The digital processing module 210 may comprise suitable logic, circuitry, interfaces, and/or code that may be operable to process digitized received signals. In an exemplary embodiment of the invention, the digital processing module 210 may comprise one or more digital filters and/or may be operable to digital convert and IF signals to a baseband signal. An exemplary digital processing module 210 is depicted in FIG. 2C. The digital processing module 210 may be implemented in the digital processor 29 of FIG. 1. The digital processing module 210 may process received signals in a plurality of stages. One or more points from which a received signal may be output as signals 211a and 211b may be before or after one or more of the processing stages. Although two signals are depicted as being output from the digital processing module 210 to the BBSSI module 212, the invention is not limited to any particular number of signals 211. In an exemplary embodiment of the invention, the digital processing module 210 may be implemented by the DSP 29 utilizing the memory 27.

The baseband signal strength indication (BBSSI) module 212 may comprise suitable logic, circuitry, interfaces, and/or code that may be operable to determine the signal strength of one or more signals 211 from the digital processing module 210. Samples of the received signal may be conveyed to the In an exemplary embodiment of the invention, the BBSSI module 212 may be implemented by the DSP 29 utilizing the memory 27, the processor 25 utilizing the memory 27, or a combination thereof.

The radio frequency signal strength indication (RFSSI) module 216 may comprise suitable logic, circuitry, interfaces, and/or code that may be operable to determine the signal strength of one or more signals 221 from the ADC 220. In an exemplary embodiment of the invention, the RFSSI module 216 may be implemented by the DSP 29 utilizing the memory 27, the processor 25 utilizing the memory 27, or a combination thereof. In another embodiment of the invention, the RFSSI module 216 may comprise, for example, an envelope detector and may be implemented in the analog front-end 23. In this regard, in instances that the signal 203 is too high in frequency to be digitized by a suitable ADC 220, a signal strength indication may be generated and subsequently digitized and conveyed to the blocker detection and AGC module 214.

The blocker detection and AGC module 214 may comprise suitable logic, circuitry, interfaces, and/or code that may be operable to determine the presence of a blocker in a received signal and/or determine the strength of a blocker present in a received signal. The determination(s) may be made utilizing values output by the RFSSI module 216 and the BBSSI module 212. The determination(s) may be made utilizing one or more threshold values, margin values, scaling factors, and/or one or more look-up tables 30, any and/or all of which may be stored in the memory 27. The blocker detection and AGC module 214 may also comprise suitable logic, circuitry, interfaces, and/or code that may be operable to control gain settings for the gain and/or filtering modules 202 and 206. The gain setting may be controlled based on the presence and/or strength of a blocker signal and may be controlled utilizing one or more look-up tables 30 which may be stored in the memory 27.

The ADC 220 may comprise suitable logic, circuitry, interfaces, and/or code that may be operable to convert the analog signal 207 to a digital signal 209. In an exemplary embodiment of the invention, the ADC 208 may be implemented in the analog front-end 23 of FIG. 1.

In operation, an RF signal may be received and amplified and/or filtered by the module 202 resulting in the signal 203. In an exemplary embodiment of the invention, the gain of the module 202 may initially be set to a sufficiently low value so that components of the receive chain are not saturated by even a worst case blocker. The signal 203 may be down-converted by the mixer 204 resulting in the signal 205. The signal 203 and/or the signal 205 may be conveyed to the ADC 220 for use in blocker detection/measurement and automatic gain control. The signal 205 may be filtered and/or amplified by the module 206 resulting in the signal 207. The signal 207 may be converted to digital signal 209 by the ADC 208. The signal 209 may be processed by the module 210 and the digital processing module 210 may select one or more channels of the signal 209 for output to a modem (not shown). Multiple stages of processing may occur within the digital processing module 210. One or more signals 211, which may be utilized for blocker detection/measurement and automatic gain control, may be output from one or more points in the multi-stage processing path.

The ADC 220 may digitize the signal(s) 203 and/or 205 to generate the signal(s) 221. The RFSSI 216 may determine the strength of one or more signal(s) 221 to generate one or more signal strength indications 217. Details of an exemplary RFSSI module 216 are described below with respect to FIG. 2B. The BBSSI 212 may determine the strength of the one or more signals 211, which are output by the digital processing module 210, to generate one or more signal strength indications 213.

Values of the one or more signal strength indications 213 and/or values of the one or more signal strength indications 217 may be utilized by the blocker detection and AGC module 214 to determine the presence and/or strength of a blocker signal in the received RF signal. The results of the determination of whether a blocker is present and/or the strength of a blocker may be utilized to generate the gain control signals 219a and 219b. In this regard, the results may be utilized in conjunction with one or more equations and/or look-up tables 30 to determine appropriate gain settings for the modules 202 and 206.

Values of the signal strength indication 217 may be periodically or aperiodically updated by the RFSSI 216 and periodically and/or aperiodically read by the blocker detection and AGC module 214. Similarly, values of the signal strength indication 213 may be periodically or aperiodically updated by the RFSSI 212 and periodically and/or aperiodically read by the blocker detection and AGC module 214. In this regard, values of the signal strength indication 213 may be updated synchronously or asynchronously with updates of values of the signal strength indication 217.

In various embodiments of the invention, multiple values of the signal strength indication 213 and/or multiple values of the signal strength indication 217 may be utilized to detect the presence of, and/or determine a strength of, a blocker signal. For example, multiple values of the signal strength indication 213 may be generated and a maximum or minimum of the multiple values may be utilized to detect the presence of, and/or determine a strength of, a blocker signal. Similarly, multiple values of the signal strength indication 217 may be generated and a maximum or minimum of the multiple values may be utilized to detect the presence of, and/or determine a strength of, a blocker signal. As another example, multiple values of the signal strength indication 213 may be mathematically and/or logically combined, and a result of the combination may be utilized to detect the presence of, and/or determine a strength of, a blocker signal. Similarly, multiple values of the signal strength indication 217 may be mathematically and/or logically combined, and a result of the combination may be utilized to detect the presence of, and/or determine a strength of, a blocker signal. Logical and/or mathematical combination may comprise, for example, and averaging and/or weighted summing. The multiple values of the signals strength measurements 213 and/or 217 may, for example, comprise a specified number of values and/or a number of values generated over a specified amount of time.

Figure 2B:
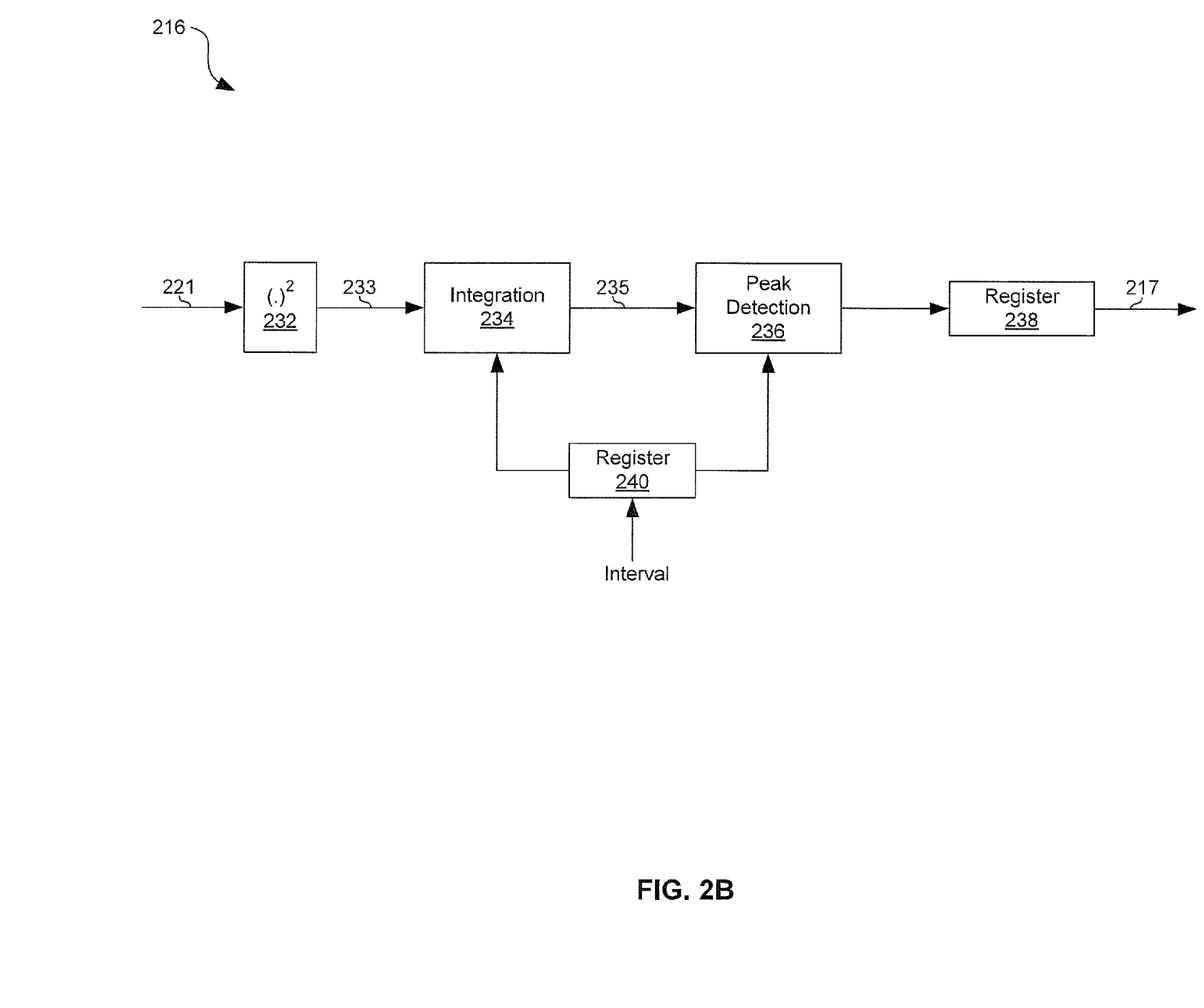
FIG. 2B is a block diagram illustrating an exemplary signal strength indicator, in accordance with an embodiment of the invention.
Figure 2C:
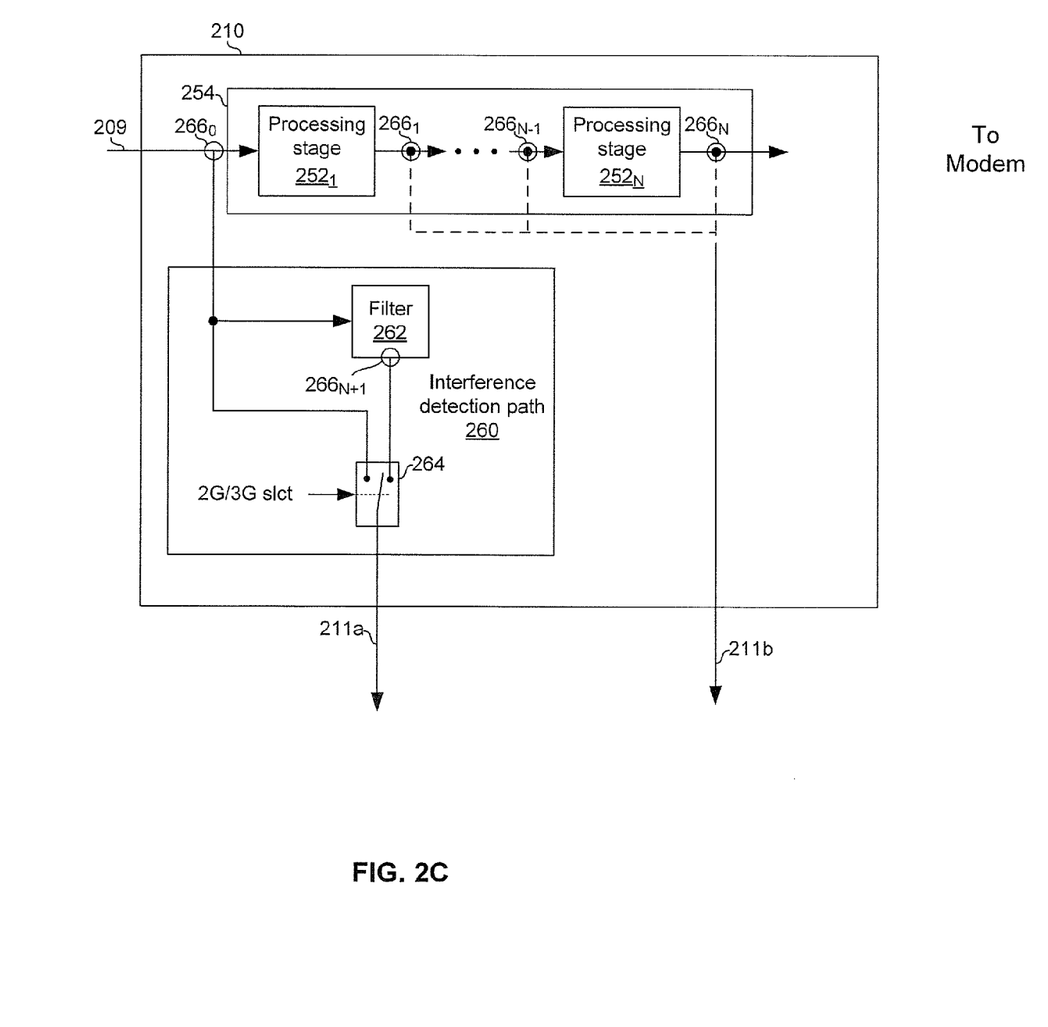
FIG. 2C is a block diagram illustrating a digital processing module, in accordance with an embodiment of the invention.

FIG. 2B is a block diagram illustrating an exemplary signal strength indicator, in accordance with an embodiment of the invention. Referring to FIG. 2B, the RFSSI module 216 may comprise a squaring module 232, an integration module 234, a peak detection module 236, and registers 238 and 240.

The squaring module 232 may comprise the suitable logic, circuitry, interfaces, and/or code that may be operable square the signal 221 to generate the signal 233. In this regard, the signal 233 may correspond to the magnitude of the most recent sample of the signal 221.

The integration module 234 may comprise suitable logic, circuitry, interfaces, and/or code that may be operable to integrate the signal 223 and output the result as signal 235. In this manner, the signal 235 may correspond to the power of the signal 221. In an exemplary embodiment of the invention, the number of samples, $I_{INT}$, of the integration interval may be programmable via the register 240.

The peak detection module 236 may comprise suitable logic, circuitry, interfaces, and/or code that may be operable to determine the peak value of the signal 235 over a detection interval and output the peak value at the end of the current detection interval or start of the subsequent detection interval. The peak value may be stored to the register 238. In an exemplary embodiment of the invention, the number of samples, $I_{PD}$, of the detection interval may be programmable via the register 240.

In operation, the samples of the signal 221 may be squared by the squaring module 232 and the resulting signal 233 may be integrated over a number of samples $I_{INT}$ by the integration module 234. The result 235 of the integration may be output to the peak detection module 236. The peak detection module 236 may track the signal 235 over a number of samples $I_{PD}$ and output the peak value during that interval to the register 238. The contents of the register 238 may be conveyed to the blocker detection and AGC module 214 (FIG. 2A) as signal strength indication 217.

FIG. 2C is a block diagram illustrating a digital processing module, in accordance with an embodiment of the invention. Referring to FIG. 2C, the digital processing module 210 may comprise register 252, register 258, data path 254, and interference detection path 260.

The data path 254 may comprise a plurality, N, of processing stages 252, where each stage $252_n$ may comprise, for example, a digital filter, digital gain block, and/or digital frequency conversion block, where N is a positive integer and n is an integer between 1 and N. In an exemplary embodiment of the invention, at least one of the stages $252_1$-$252_N$ may comprise a channel selection filter. The signal 211b conveyed to the blocker detection and AGC module 214 (FIG. 2A) may correspond to any of the probe points $266_1$-$266_N$ of the data path 254.

The interference detection path 260 may comprise a filter 262 and a switch 264. In an exemplary embodiment of the invention, the signal 209 may be an IF signal when the received signal is a 2G signal and may be a baseband signal when the received signal is a 3G signal. In instances that the signal 209 is an IF signal, the ADC 208 may comprise a delta-sigma ADC capable of digitizing an IF signal and the filter 262 may filter out the quantization noise in the signal 209. In instances that the signal 209 is a baseband signal, the switch may select the signal 209 to be conveyed as the signal 211a. Thus, the signal 211b may correspond to one of the probe points $266_0$ and $266_{N+1}$.

Figure 3A:
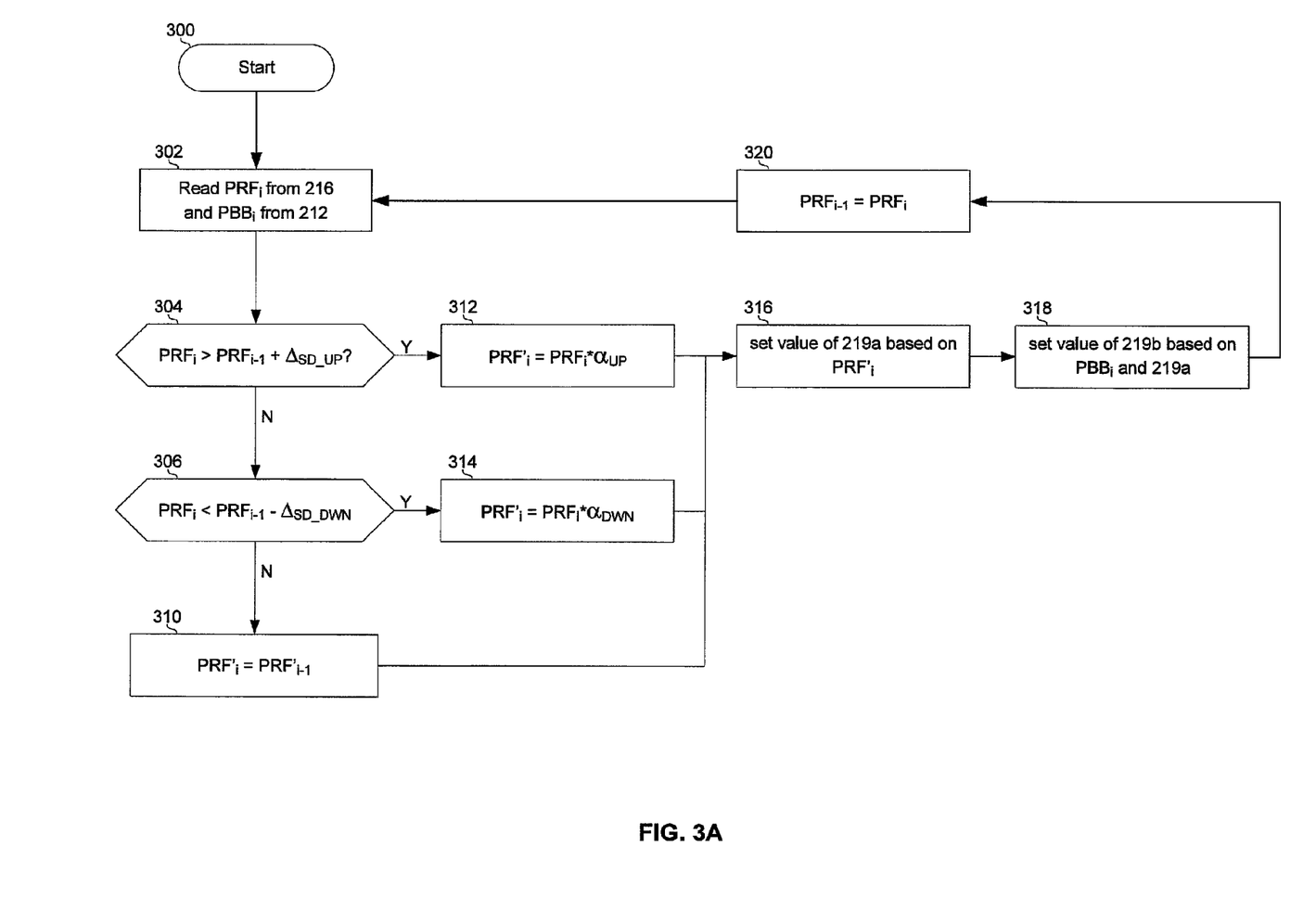
FIG. 3A is a flow chart illustrating an exemplary soft decision technique for controlling gain based on strength of a blocker signal, in accordance with an embodiment of the invention.

FIG. 3A is a flow chart illustrating an exemplary soft decision technique for controlling gain based on strength of a blocker signal, in accordance with an embodiment of the invention. Referring to FIG. 3A, the steps may begin with step 300 and advance to step 302. In step 302, a current value, $PRF_i$, of the signal strength indication 217 and a current value, $PBB_i$, of the signal strength indication 213 may be conveyed to the blocker detection and AGC module 214. Subsequent to step 302, the exemplary steps may advance to step 304.

In step 304, it may be determined whether $PRF_i$ is greater than the sum of the previous value, $PRF_{i-1}$, of the signal strength indication 217 and a margin $\Delta_{SD\_UP}$. In instances that $PRF_i$ is greater than the sum, the exemplary steps may advance to step 312.

In step 312, $PRF_i$ may be scaled by a scaling factor $\alpha_{UP}$ to generate a scaled signal strength value $PRF'_i$. Subsequent to step 312, the exemplary steps may advance to step 316.

In step 316, a value of the gain control signal 219a may be set based on the scaled signal strength value $PRF'_i$. In an exemplary embodiment of the invention, the value of the signal 219a may be set based on one or more equations or other relationship. That is, $PRF'_i$ may be utilized for generating a value of signal 219a. In an exemplary embodiment of the invention, $PRF'_i$ may be utilized as an index, and/or utilized to generate an index, of one or more look-up tables 30, and a value for the gain control signal 219a may be retrieved from the look-up tables 30. Subsequent to step 316, the exemplary steps may advance to step 318.

In step 318, a value of the gain control signal 219b may be determined based on $PRF'_i$, $PBB_i$, and the value of signal 219a determined is step 316. In an exemplary embodiment of the invention, the value of the signal 219b may be set utilizing one or more equations. That is, $PRF'_i$, $PBB_i$, and the value of signal 219a generated in step 316 may be utilized to generate a value of signal 219b. In an exemplary embodiment of the invention, $PRF'_i$, $PBB_i$, and/or the value of signal 219a generated in step 316 may be utilized as an index, and/or utilized to generate an index, of one or more look-up, and a value for the gain control signal 219b may be retrieved from the look-up tables 30. Subsequent to step 318, the exemplary steps may advance to step 320.

In step 320, the current value, $PRF_i$, of the signal strength indication 217 may become the previous value, $PRF_{i-1}$, of the signal strength indication 217. Subsequent to step 320, the exemplary steps may return to step 302.

Returning to step 304, in instances that $PRF_i$ is less than the sum of $PRF_{i-1}$ and a margin $\Delta_{SD\_UP}$, the exemplary steps may advance to step 306. In step 306, it may be determined whether $PRF_i$ is less than $PRF_{i-1}$ minus a margin $\Delta_{DS\_DWN}$. In instances that $PRF_i$ is less than $PRF_{i-1}$ minus a margin $\Delta_{DS\_DWN}$, then the exemplary steps may advance to step 314.

In step 314, $PRF_i$ may be scaled by a scaling factor $\alpha_{DWN}$ to generate the scaled signal strength value $PRF'_i$. Subsequent to step 314, the exemplary steps may advance to step 316.

Returning to step 306, in instances that $PRF_i$ is greater than $PRF_{i-1}$ minus a margin $\Delta_{DS\_DWN}$, then the exemplary steps may advance to step 310. In step 310, the current scaled value PRF'$_i$ may be set to the previous scaled signal strength value PRF'$_{i-1}$. Subsequent to step 310, the exemplary steps may advance to step 316.

Figure 3B:
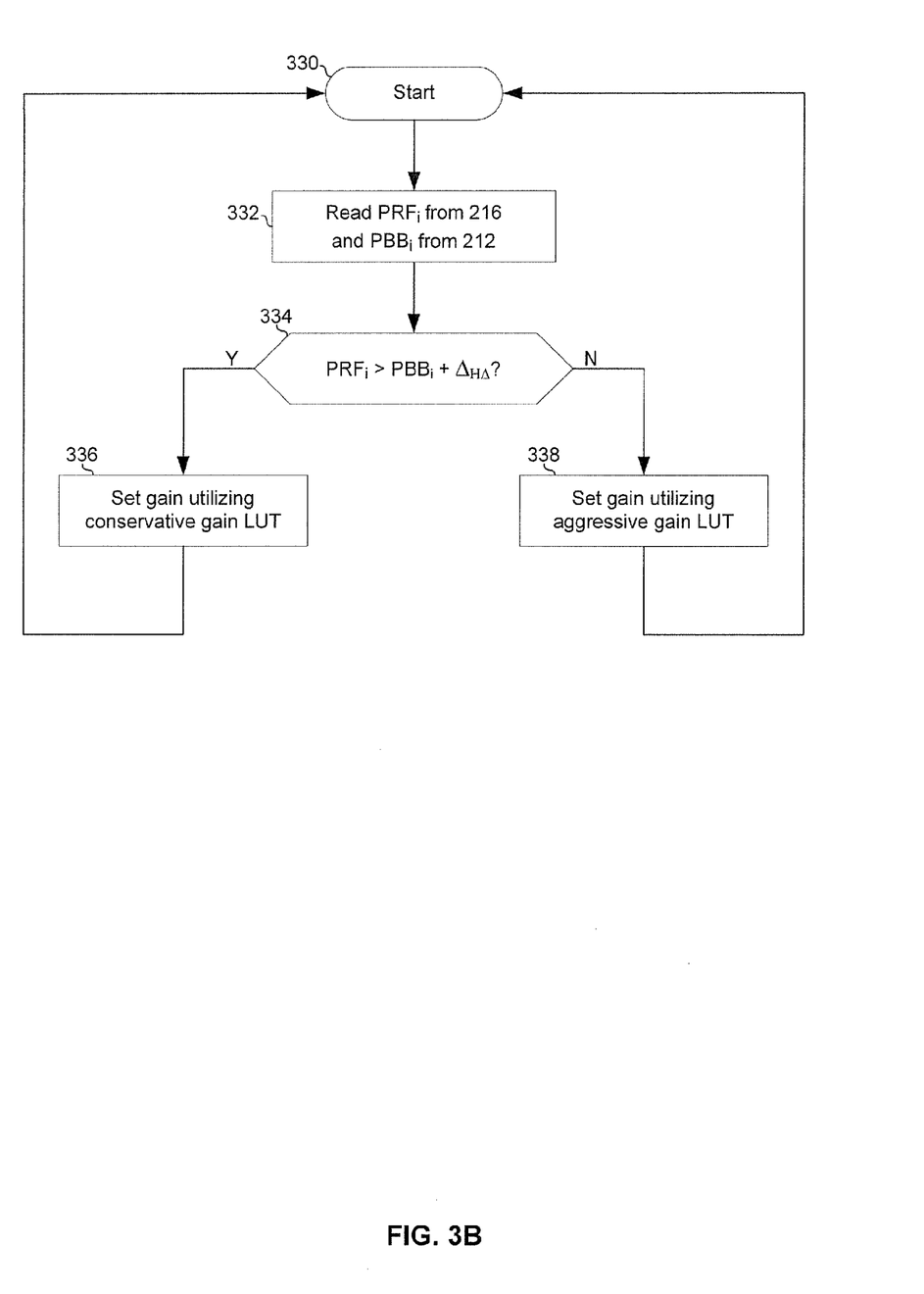
FIG. 3B is a flow chart illustrating an exemplary hard decision technique for controlling gain based on strength of a blocker signal, in accordance with an embodiment of the invention.

FIG. 3B is a flow chart illustrating an exemplary hard decision technique for controlling gain based on strength of a blocker signal, in accordance with an embodiment of the invention. Referring to FIG. 3B, subsequent to start step 330, the exemplary steps may advance to step 332. In step 332, a current value, PRF$_i$, of the signal strength indication 217 and a current value, PBB$_i$, of the signal strength indication 213 may be conveyed to the blocker detection and AGC module 214. Subsequent to step 332, the exemplary steps may advance to step 334.

In step 334, it may be determined whether PRF$_i$ is greater than the sum of PBB$_i$ plus a margin $\Delta_{HD}$. In this regard, the PRF$_i$ being greater than the sum of PBB$_i$ plus a margin $\Delta_{HD}$ may indicate a blocker signal is present in the received signal. In instances that a blocker is present, the exemplary steps may advance to step 336.

In step 336, values of the gain control signals 219a and 219b may be retrieved from a conservative gain look-up table 30. In this regard, gain values in the conservative gain look-up table 30 may be relatively low compared to corresponding values in a corresponding aggressive gain look-up table 30. In this manner, utilizing the conservative gain look-up table 30 may reduce or eliminate instances when the blocker signal causes one or more components to go into saturation.

Returning to step 334, in instances that a blocker is not present in the received signal, the exemplary steps may advance to step 338. In step 338, values of the gain control signals 219a and 219b may be retrieved from an aggressive gain look-up table 30. In this regard, gain values in the aggressive gain look-up table 30 may be relatively high compared to corresponding values in a corresponding conservative gain look-up table 30. In this manner, utilizing the aggressive gain look-up table 30 may increase gain values, and consequently improve the noise figure, in instances that there is relatively low risk of a blocker signal causing one or more components of the communication device 20 to go into saturation.

Figure 3C:
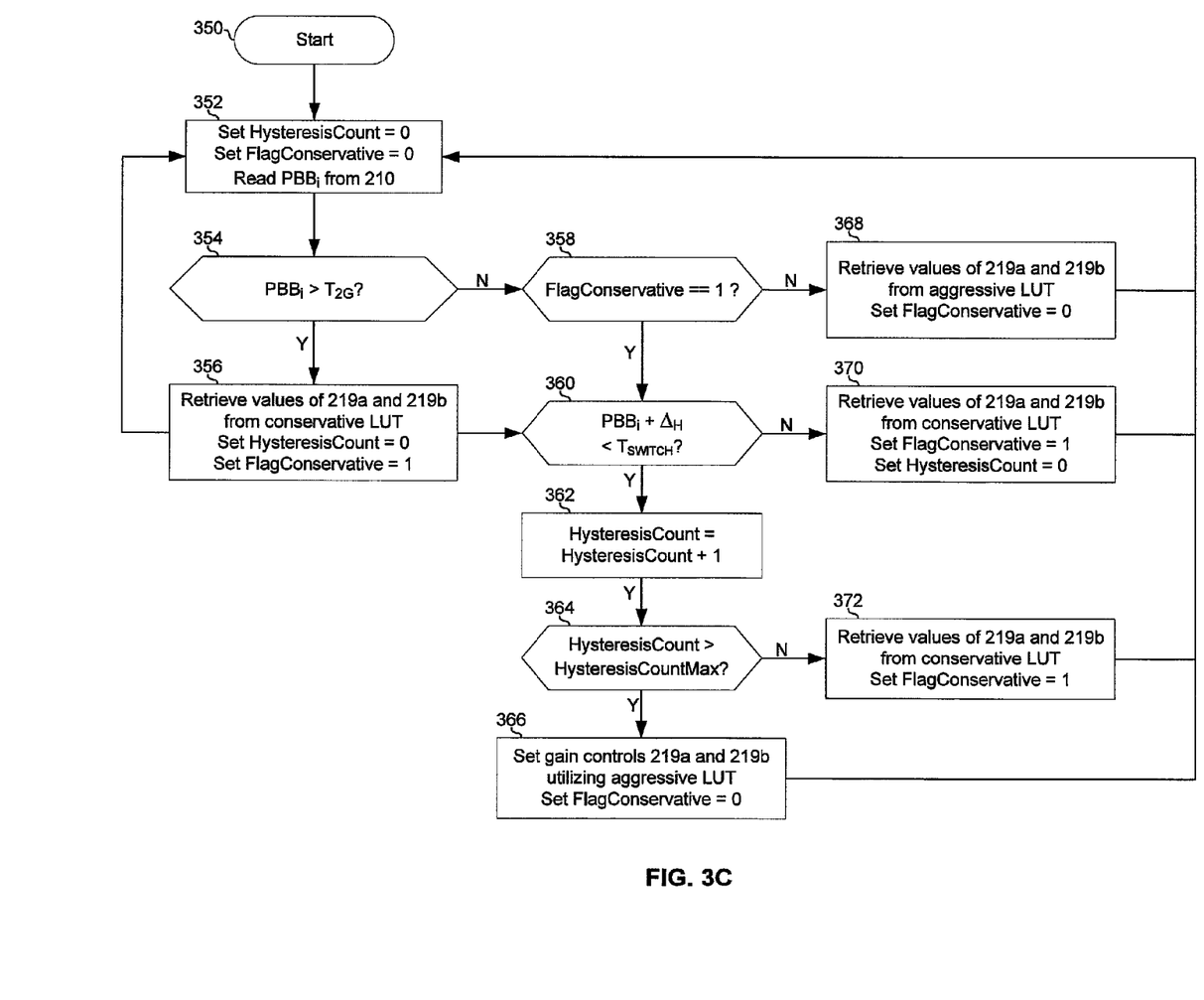
FIG. 3C is a flow chart illustrating an exemplary hard decision technique for controlling gain based on strength of a blocker signal in a 2G wireless system, in accordance with an embodiment of the invention.

FIG. 3C is a flow chart illustrating an exemplary hard decision technique for controlling gain based on strength of a blocker signal in a 2G wireless system, in accordance with an embodiment of the invention. Referring to FIG. 3C, subsequent to start step 350, the exemplary steps may advance to step 352. In step 352, a parameter, HysteresisCount, may be initialized to 0 and a parameter, FlagConservative, may be initialized to 0. Also in step 352, a current value, PBB$_i$, of the signal strength indication 213 may be conveyed to the blocker detection and AGC module 214. Subsequent to step 352, the exemplary steps may advance to step 354.

In step 354, it may be determined whether PBB$_i$ is greater than a threshold, T$_{2G}$. In instances that PBB$_i$ is greater than T$_{2G}$, the exemplary steps may advance to step 356. In step 356, values of gain control signals 219a and 219b may be retrieved from a conservative gain look-up table 30. Subsequent to step 354, the exemplary steps may advance to step 360.

Returning to step 354, in instances that PBB$_i$ is less than T$_{2G}$, the exemplary steps may advance to step 358. In step 358, it may be determined whether the parameter FlagConservative is equal to 1. In instances that FlagConservative is not equal to 1, the exemplary steps may advance to step 368.

In step 368, values of the gain control signals 219a and 219b may be retrieved from an aggressive look-up table 30. Also in step 368, the parameter FlagConservative may be set to 0. Subsequent to step 368, the exemplary steps may return to step 352.

Returning to step 358, in instances that FlagConservative is equal to 1, the exemplary steps may advance to step 360. In step 360, it may be determined whether the sum of PBB$_i$ and a hysteresis margin, $\Delta_H$, is less than a threshold, T$_{SWITCH}$. In instances that, PBB$_i$ plus $\Delta_H$ is greater than T$_{SWITCH}$, the exemplary steps may advance to step 370.

In step 370, values of the gain control signals 219a and 219b may be retrieved from a conservative look-up table 30. Also in step 370, the parameter FlagConservative may be set to 1 and the parameter HysteresisCount may be set to 0. Subsequent to step 370, the exemplary steps may return to step 352.

Returning to step 360, in instances that, PBB$_i$ plus $\Delta_H$ is less than T$_{SWITCH}$, the exemplary steps may advance to step 362. In step 362, the parameter HysteresisCount may be incremented by 1. Subsequent to step 362, the exemplary steps may advance to step 364.

In step 364, it may be determined whether the parameter HysteresisCount is greater than a maximum value, HysteresisCountMax, of HysteresisCount. In instances that HysteresisCount is less than HysteresisCountMax, the exemplary steps may advance to step 372.

In step 372, values of the gain control signals 219a and 219b may be retrieved from a conservative gain look-up table 30. Also in step 372, the parameter FlagConservative may be set to 1. Subsequent to step 372, the exemplary steps may return to step 352.

Returning to step 364, in instances that HysteresisCount is greater than HysteresisCountMax, the exemplary steps may advance to step 366. In step 366, values of the gain control signals 219a and 219b may be retrieved from an aggressive gain look-up table 30. Also in step 366, the parameter FlagConservative may be set to 0. Subsequent to step 366, the exemplary steps may return to step 352.

Various aspects of a method and system for blocker detection and automatic gain control are provided. In an exemplary embodiment of the invention, a communication device 20 may generate one or more first signal strength indications 217 based on a strength of a received signal at one or more points, such as the points 222$_1$ and 222$_2$, in the analog front-end 23 of the communication device 20. The communication device 20 may generate one or more second signal strength indications 213 based on a strength of the received signal at one or more points, such as the points 266$_0$ and 266$_{N+1}$, in a digital processing module 210 of the communication device 20. The points 222$_1$ or 222$_2$ in the analog front-end 23 may be, respectively, an input and an output of a down-conversion mixer 204. The points 266$_0$ or 266$_{N+1}$ in the digital processing module 210 may be, respectively, an output of an analog-to-digital converter 208 and an output of a channel selection filter 252.

The communication device 20 may control, utilizing one or more first signal strength indications 217 and the one or more second signal strength indications 213, a gain of one or more components 202 and/or 206 of the communication device 20. Generation of each of the one or more first signal strength indications 217 may comprise converting the output 205 of the down-conversion mixer 204 to a digital signal 221, squaring the digital signal 221 to generate a squared signal 233; integrating the squared signal 233 to generate a power signal 235, and detecting peaks of the power signal 235. The communication device 20 may determine, utilizing the one or more first signal strength indications 217 and the one or more second signal strength indications 213, whether a blocker signal is present in the received signal. The communication device 20 may control the gain of the components 202 and/or 206 based on a result of the determination of whether a blocker is present. The communication device 20 may determine, utilizing the one or more first signal strength indications 217 and the one or more second signal strength indications 213, a strength of a blocker signal present in the received signal. The communication device 20 may control the gain based on a result of the determination of the strength of the blocker signal.

Values of the one or more first signal strength indications 217 may be generated periodically or aperiodically, and the gain of the components 202 and/or 206 may be controlled based on a comparison of a current value, $PRF_i$, of the one or more first signal strength indications 217 with a previous value, $PRF_{i-1}$, of the one or more first signal strength indications 217. The current value, $PRF_i$, of the one or more first signal strength indications 217 may be scaled utilizing a first scaling factor $\alpha_{UP}$ in instances that the current value, $PRF_i$, of the one or more first signal strength indications 217 is greater than the sum or the previous value, $PRF_{i-1}$, of the one or more first signal strength indications 217 and a first margin, $\Delta_{SD\_UP}$. The current value, $PRF_i$, of the one or more first signal strength indications 217 may be scaled by a second scaling factor $\alpha_{DWN}$ in instances that the current value, $PRF_i$, of the one or more first signal strength indications 217 is less than the previous value, $PRF_{i-1}$, of the one or more first signal strength indications 217 minus a second margin $\Delta_{SD\_DWN}$. The gain of the one or more components 202 and 206 may be controlled utilizing a first look-up table 30 in instances that the current value, $PRF_i$, of the one or more first signal strength indications 217 is greater than a sum of current value, $PBB_i$, of the one or more second signal strength indications 213 and a margin $\Delta_{HD}$. The gain of the one or more components 202 and 206 may be controlled utilizing a second look-up table 30 in instances that the current value, $PRF_i$, of the one or more first signal strength indications 217 is less than the sum of a current value of the one or more second signal strength indications 213 and a margin $\Delta_{HD}$.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for integrated blocker detection and automatic gain control.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communications, the method comprising:
   generating a first signal strength indication based on a first strength of a received signal modified by a first gain and filtering device at a first point in a communication device, wherein said first point is in an analog front-end of said communication device;
   generating a second signal strength indication based on a second strength of said received signal modified by said first gain and filtering device and a second gain and filtering device at a second point in said communication device, wherein said second point is in a digital processing module of said communication device;
   comparing said first signal strength indication to a previous signal strength indication and a predetermined strength value;
   scaling said first signal strength indication by a scaling factor based on said comparison;
   generating a first control signal for controlling said first gain and filtering device based on said scaling; and
   controlling said second gain and filtering device based on said second signal strength indication and said first control signal.

2. The method according to claim 1, wherein said generating said first signal strength indication comprises:
   converting an output of a down-conversion mixer to a digital signal;
   squaring said digital signal to generate a squared signal;
   integrating said squared signal to generate a power signal; and
   detecting peaks of said power signal.

3. The method according to claim 1, further comprising:
   determining, utilizing said first signal strength indication and said second signal strength indication, whether a blocker signal is present in said received signal; and
   controlling a gain of said first gain and filtering device and said second gain and filtering device based on a result of said determination of whether said blocker signal is present.

4. The method according to claim 1, further comprising:
   determining, utilizing said first signal strength indication and said second signal strength indication, a strength of a blocker signal present in said received signal; and
   controlling a gain of said first gain and filtering device and said second gain and filtering device based on a result of said determination of said strength of said blocker signal.

5. The method according to claim 1, wherein said first point in said analog front-end is an input or an output of a down-conversion mixer.

6. The method according to claim 1, wherein said second point in said digital processing module is an output of an analog-to-digital converter.

7. The method according to claim 1, wherein said second point in said digital processing module is an output of a channel selection filter.

8. A system for communications, the system comprising:
one or more circuits and/or processors for use in a communication device, wherein said one or more circuits and/or processors comprise an analog front-end and a digital processing module, and wherein said one or more circuits and/or processors are configured to:
generate a first signal strength indication based on a first strength of a received signal modified by a first gain and filtering device at a first point in said analog front-end;
generate a second signal strength indication based on a second strength of said received signal modified by said first gain and filtering device and a second gain and filtering device at a second point in said digital processing module of said communication device;
compare said first signal strength indication to a previous signal strength indication and a predetermined strength value;
scale said first signal strength indication by a scaling factor based on said comparison;
generate a first control signal for controlling said first gain and filtering device based on said scaling; and
control said second gain and filtering device based on said second signal strength indication and said first control signal.

9. The system according to claim 8, wherein said one or more circuits and/or processors comprise a down-conversion mixer and wherein generation of said first signal strength indication comprises:
converting said output of said down-conversion mixer to a digital signal;
squaring said digital signal to generate a squared signal;
integrating said squared signal to generate a power signal; and
detecting peaks of said power signal.

10. The system according to claim 8, wherein said one or more circuits and/or processors are further configured to:
determine, utilizing said first signal strength indication and said second signal strength indication, whether a blocker signal is present in said received signal; and
control a gain of said first gain and filtering device and said second gain and filtering device based on a result of said determination of whether said blocker signal is present.

11. The system according to claim 8, wherein said one or more circuits and/or processors are further configured to:
determine, utilizing said first signal strength indication and said second signal strength indication, a strength of a blocker signal present in said received signal; and
control a gain of said of said first gain and filtering device and said second gain and filtering device based on a result of said determination of said strength of said blocker signal.

12. The system according to claim 8, wherein said analog front-end comprises a down-conversion mixer and said first point in said analog front-end is an input or an output of said down-conversion mixer.

13. The system according to claim 8, wherein said digital processing module comprises an analog-to-digital converter and said second point in said digital processing module is an output of said analog-to-digital converter.

14. The system according to claim 8, wherein said digital processing module comprises a channel selection filter and said second point in said digital processing module is an output of said channel selection filter.

15. A method for communications, the method comprising:
generating a first signal strength indication based on a first strength of a received signal modified by a first gain and filtering device at a first point of a communication device, wherein said first point is in an analog front-end of said communication device;
comparing said first signal strength indication to a previous signal strength indication and a predetermined strength value;
scaling said first signal strength indication by a scaling factor based on said comparison;
generating a second signal strength indication based on a second strength of said received signal modified by said first gain and filtering device and a second gain and filtering device at a second point in said digital processing module of said communication device;
controlling said first gain and filtering device based on said first signal strength indication and said scaling; and
controlling said second gain and filtering device based on said second signal strength indication and said scaling.

16. The method according to claim 15, wherein said scaling comprises:
scaling said first signal strength indication by a first scaling factor when said first signal strength indication is greater than a sum of a previous value of said first signal strength indication and a first margin, and by a second scaling factor when said first signal strength indication is less than said previous value of said first signal strength indication minus a second margin.

17. The method according to claim 15, wherein said controlling said first gain and filtering device and said controlling said second gain and filtering device comprise:
controlling said first gain and filtering device and said second gain and filtering device utilizing a first look-up table when said first signal strength indication is greater than a sum of a current value of said second signal strength indication and a margin; and
controlling said first gain and filtering device and said second gain and filtering device utilizing a second look-up table when said first signal strength indication is less than said sum of said current value of said second signal strength indication and said margin.

18. A system for communications, the system comprising:
one or more circuits and/or processors for use in a communication device, wherein said one or more circuits and/or processors comprise an analog front-end and a digital processing module, and wherein said one or more circuits and/or processors are configured to:
generate a first signal strength indication based on a first strength of a received signal modified by a first gain and filtering device at a first point of said communication device, wherein said first point is in an analog front-end of said communication device;
compare said first signal strength indication to a previous signal strength indication and a predetermined strength value;
scale said first signal strength indication by a scaling factor based on said comparison;
generate a second signal strength indication based on a second strength of said received signal modified by said first gain and filtering device and a second gain and filtering device at a second point in said digital processing module of said communication device;
control said first gain and filtering device based on said first signal strength indication and said scaling; and
control said second gain and filtering device based on said second signal strength indication and said scaling.

19. The system according to claim 18, wherein said one or more circuits and/or processors are configured to:
- scale said first signal strength indication by a first scaling factor when said first signal strength indication is greater than a sum of a previous value of said first signal strength indication and a first margin and by a second scaling factor when said first signal strength indication is less than said previous value of said first signal strength indication minus a second margin; and
- control said first gain and filtering device and said second gain and filtering device based on said scaling.

20. The system according to claim 18, wherein said one or more circuits and/or processors are configured to:
- control said first gain and filtering device and said second gain and filtering device utilizing a first look-up table when said first signal strength indication is greater than a sum of a current value of said second signal strength indication and a margin; and
- control said first gain and filtering device and said second gain and filtering device utilizing a second look-up table when said first signal strength indication is less than said sum of said current value of said second signal strength indication and said margin.

* * * * *